United States Patent [19]

Harada et al.

[11] Patent Number: 4,861,571
[45] Date of Patent: Aug. 29, 1989

[54] PROCESS FOR PREPARATION OF SYNTHETIC MORDENITE MOLDED BODY

[75] Inventors: Masashi Harada; Hiroshi Miyazaki; Keiji Itabashi, all of Shinnanyo, Japan

[73] Assignee: Toyo Soda Manufacturing Co., Ltd., Yamaguchi, Japan

[21] Appl. No.: 909,246

[22] Filed: Sep. 19, 1986

[30] Foreign Application Priority Data

Sep. 20, 1985 [JP] Japan ................. 60-206637

[51] Int. Cl.$^4$ .............................. C01B 33/26
[52] U.S. Cl. .................... 423/328; 423/328; 502/78
[58] Field of Search ............ 423/328, 328 C, 329; 502/78

[56] References Cited

U.S. PATENT DOCUMENTS 3,436,174  4/1969  Sand ................................ 423/329
3,631,262  12/1986  Altomare ........................ 423/328
3,714,366  1/1973  Fukuda et al. ................. 423/328 C
4,081,514  3/1978  Sand et al. ...................... 423/328

FOREIGN PATENT DOCUMENTS 40-18614  8/1965  Japan .
45-38975  12/1970  Japan .
979398  1/1965  United Kingdom ............... 423/328
1152028  5/1969  United Kingdom ............... 423/329

Primary Examiner—William R. Dixon, Jr.
Assistant Examiner—Anthony J. Green
Attorney, Agent, or Firm—Cushman, Darby & Cushman

[57] ABSTRACT

A synthetic mordenite molded body is prepared by a process wherein a starting mixture comprising, as the main components, a silica source, an alumina source, an alkali source and water is molded into a starting molded body, the molded body is calcined and the calcined molded body is heated in an aqueous solution of sodium silicate. The starting mixture has incorporated therein a mordenite seed crystal powder. When the molded body is calcined, the temperature is elevated by heating to a calcination temperature not lower than 400° C. at an average rate of at least 10° C./min and calcination is conducted at the calcination temperature within a time period of 2 hours. When the calcined molded body is crystallized, an aqueous solution of sodium silicate having an $SiO_2$ concentration of 7 to 25% by weight, an $Na_2O$ concentration of 2 to 8% by weight and an $SiO_2$/$Na_2O$ molar ratio of from 0.9 to 4.0 is used as the aqueous solution of sodium silicate.

12 Claims, 1 Drawing Sheet

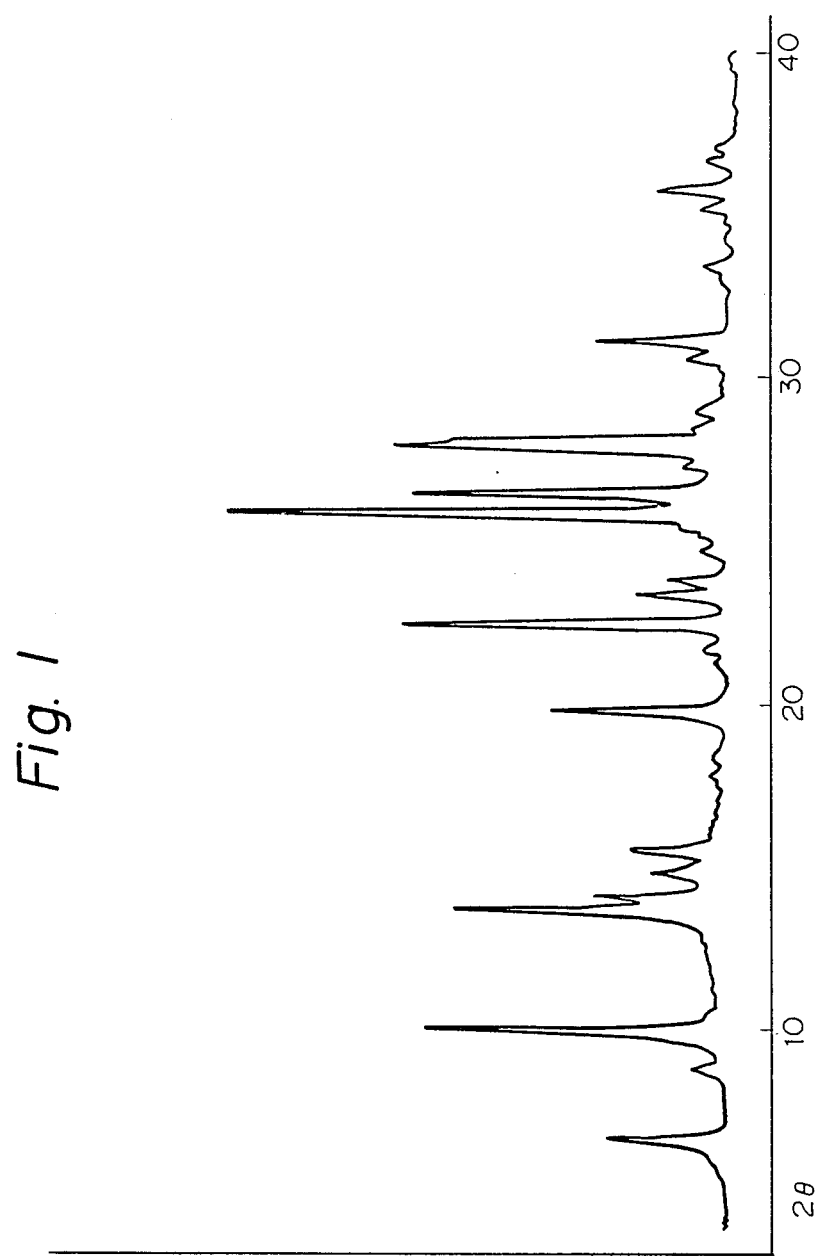

PROCESS FOR PREPARATION OF SYNTHETIC MORDENITE MOLDED BODY

BACKGROUND OF THE INVENTION

1. Field of the Invention

The present invention relates to a process for the preparation of a synthetic mordenite molded body, in which a molded body of a starting mixture is first prepared and the molded body is calcined and then crystallized.

2. Description of the Related Art

Mordenite zeolite is a kind of a naturally produced zeolite, and various processes for synthesizing this zeolite have been proposed. Most of these proposals are directed to the production of mordenite crystal powders.

When synthetic mordenite is industrially utilized, use of a mordenite crystal powder is often difficult and it is ordinarily used after it has been molded into spheres, extrudates or other appropriate shapes.

However, since a zeolite crystal powder has no self-bondability, when a molded body is prepared, in order to impart appropriate plasticity and strength, an organic or inorganic binder is ordinarily used. As the inorganic binder, there can be mentioned clay minerals such as kaolin and montmorillonite, and silica sol and alumina sol. However, often the mechanical strength of the thus prepared mordenite molded body is drastically reduced by a severe treatment such as an acid treatment or heat treatment in the process of forming a catalyst. Furthermore, even if the mechanical strength is maintained at a certain level, the zeolite component is diluted by the added binder, and in order to impart a mechanical strength sufficient to resist industrial application, the amount of the binder should be increased. Moreover, if a molded body of this type is used, sometimes a calcination product of the binder, such as a clay mineral, causes an undesired side reaction.

Several processes have been proposed in which a molded body of a starting mixture is formed instead of a molded body composed of a mixture of a mordenite powder and binders, and the molded body is calcined and crystallized to obtain a synthetic mordenite molded body having substantially the same shape as the shape before the crystallization.

In these conventional processes, however, no special contrivance is made in the step of calcining the molded body, or the step of withdrawing the synthetic mordenite molded body from a reaction vessel or washing this molded body after crystallization. The calcination temperature and time for the molded body are only mentioned in Japanese Examined Patent Publication Nos. 40-18614 and 45-38975. In the process disclosed in Japanese Patent Publication No. 40-18614, a large amount of powdery mordenite is formed as a by-product, in addition to a synthetic mordenite molded body, and this powder adheres tightly to particles of the molded body. Accordingly, the particles of the molded body agglomerate to form a large mass, and withdrawal from the reaction vessel and washing become difficult.

SUMMARY OF THE INVENTION

It is a primary object of the present invention to solve the problem of the prior art and to provide a process for the preparation of a synthetic mordenite molded body, by which undesirable adhesion of a crystallized mordenite molded body by an aqueous solution of sodium silicate having a high viscosity and powdery mordenite formed as a by-product can be avoided, handling of the crystallized mordenite molded body can be performed very easily and safely, and a synthetic mordenite molded body having a high purity and a high crystallinity can be obtained.

In accordance with the present invention, there is provided a process for the preparation of a synthetic mordenite molded body, which comprises molding a starting mixture comprising as the main components a silica source, an alumina source, an alkali source and water (the obtained molded body is called the "starting molded body"), calcining the starting molded body (the obtained calcined body is called the "calcined molded body") and heating the calcined molded body in an aqueous solution of sodium silicate (the obtained molded body is called the "crystallized molded body"), said process being characterized in that a mordenite seed crystal powder is made present in the starting mixture; when the starting molded body is calcined, the temperature is elevated by heating to a calcination temperature not lower than 400° C. at an average elevation rate of at least 10° C./min and calcination is conducted at said calcination temperature within a time period of 2 hours; and when the calcined molded body is crystallized, an aqueous solution of sodium silicate having an $SiO_2$ concentration of 7 to 25% by weight, an $Na_2O$ concentration of 2 to 8% by weight and an $SiO_2/Na_2O$ molar ratio of from 0.9 to 4.0 is used as the aqueous solution of sodium silicate.

BRIEF DESCRIPTION OF THE DRAWING

FIG. 1 is a powder X-ray diffraction diagram of the synthetic mordenite molded body obtained in Example 1.

DESCRIPTION OF THE PREFERRED EMBODIMENTS

In the instant specification, the average elevation rate of the temperature is expressed by the following formula:

$$(t' - t_0)/T$$

wherein t' stands for the calcination temperature (°C.), to stands for the temperature (°C.) at which elevation of the temperature starts, and T stands for the time (minutes) required for elevation to the calcination temperature from the point of the start of elevation of the temperature.

The starting materials used in the present invention are not particularly critical, and in the mixture of the starting materials, the $SiO_2/Al_2O_3$ molar ratio is from 9 to 30, preferably from 10 to 20, and the $Na_2O/Al_2O_3$ molar ratio is 0.5 to 7.5, preferably, 0.5 to 2. Accordingly, if the composition of the starting molded body and the composition of the crystallizing solution are appropriately selected, a high-silica mordenite molded body having an $SiO_2/Al_2O_3$ ratio of 12 to 30 can be prepared.

As the silica source, there can be used amorphous silica, silica sol, silica gel, sodium silicate, and naturally produced diatomaceous earth and other silicate minerals. Where a natural silica source is used, preferably impurities undesirable for the production of zeolite are removed in advance. As the alumina source, there can be used aluminum hydroxide, aluminum oxide, sodium aluminate, aluminum sulfate, aluminum nitrate, and naturally produced aluminosilicate minerals such as kaolinite and montmorillonite. When a natural silica or alumina source is used, the content of alumina or silica in the starting material must be taken into consideration in determining the above-mentioned composition. Sodium silicate or sodium aluminate also acts as the alkali source. Sodium hydroxide may be used as the alkali source.

The presence of a mordenite seed crystal powder in the starting material can reduce the amount of powdery mordenite formed as a by-product as compared with the case where the mordenite seed crystal powder is not present. Thus, the yield of the mordenite molded body can be improved and adhesion of molded bodies to one another by powdery mordenite can be greatly reduced.

Preferably, the amount of the seed crystal powder present in the starting mixture is 0.1 to 10% by weight based on the starting mixture on a dry basis. If the amount of the seed crystal is smaller than 0.1% by weight, a substantial effect cannot be attained by the addition of the seed crystal, and if the amount of the seed crystal exceeds 10% by weight, a further increase of the effect cannot be obtained. The effect is most prominent when the amount of the seed crystal is 0.5 to 5% by weight.

Good results are obtained when the particle diameter of the seed crystal is about 1 $\mu$m to about 5 $\mu$m, but an agglomerate of crystal particles having scores of microns may be used. In this case, preferably the agglomerate is pulverized before it is used.

The seed crystal may be either natural mordenite or synthetic mordenite. When synthetic mordenite is used, the $SiO_2/Al_2O_3$ molar ratio may be within the range of from 10 to 30. Ordinarily, this molar ratio is adjusted to a value similar to that of the intended mordenite molded body. Of course, no particular problem arises when synthetic mordenite having an $SiO_2/Al_2O_3$ molar ratio different from that of the intended mordenite molded body issued.

The effect of the seed crystal is prominent when the seed crystal is uniformly dispersed in the starting material mixture. The seed crystal may be added in the form of powder and mixed with the starting material powder or may be dispersed in water to be added to the starting material powder, or in sodium silicate. The optimum amount of water to be added differs according to the shape and size of the starting molded body or the kind of molding machine used for molding the starting mixture, but generally, this amount is in the range of from 40 to 120% by weight based on the starting mixture on a dry basis. If the amount of water is too small and below this range, molding is very difficult, and if the amount of water is too large and exceeds the above-mentioned range, the molded body is readily deformed or mutual adhesion of the molded body is caused.

The uniform starting material mixture is molded into a desired shape. When absorbents or catalysts are intended, the molded body is in the shape of spheres or extrudates, but in other special uses, the shape of the molded body is cylindrical, pillar, plate-like or honeycomb. This molded body can be obtained when the starting materials are combined within the above-mentioned range of the composition.

In order to increase the viscosity and elasticity of the starting mixture and reduce the friction with the molding machine for improving the moldability at the molding step, carboxymethyl cellulose, stearic acid, alcohols, surface active agents or fibers may be added to the starting mixture as a molding assistant or lubricant.

An extruder, a tableting machine, or a rotary molding machine is used as the molding machine according to the shape of the molded body.

The starting mixture which has been molded into a desired shape, that is, the starting molded body, is then subjected to a calcination treatment. When an organic material is used as the molding assistant or natural starting materials are used, the starting molded body also contains this organic component. Especially when diatomaceous earth is used as the silica source, the amount of the organic component included in the starting molded body is large.

If the temperature-elevating rate is low at the calcining step, the organic component in the starting molded body is concentrated in the surface portion of the molded body and carbonized in the surface portion. If carbon is precipitated on the surface of the calcined molded body, surface exfoliation is caused in the molded body at the crystallizing step and the crystallized molded body fails to retain the shape of the calcined molded body, with the result that a crystallized molded body having a desired shape cannot be obtained. On the other hand, if calcination is conducted at a high temperature for a long time for completely removing the organic component in the starting molded body, sintering of the molded body is advanced and the pore volume of the calcined molded body is reduced with the advance of the sintering.

In view of the relations of the temperature elevating rate and calcination temperature at the time of calcination to the carbonization of the organic component in the starting molded body, the temperature is elevated to the calcination temperature at an average rate of at least 10° C./min and calcination is carried out at a temperature not lower than 400° C. within a time period of 2 hours.

If the temperature is elevated at an average rate of at least 10° C./min, the organic component in the starting molded body is uniformly decomposed without concentration in the surface portion or carbonization in the surface portion. The upper limit of the temperature-elevating rate is not particularly limited, but it is usually about 200° C./min. In order to completely and uniformly decompose the organic component in the starting molded body and impart a practically sufficient mechanical strength to the crystallized molded body, the calcination must be conducted at a temperature not lower than 400° C. However, if the calcination is carried out at too high a temperature, the reactivity is reduced because of vitrification of the starting molded body, and the pore volume is reduced. Accordingly, preferably the calcination is conducted at a temperature of 500° to 800° C. Thus, the temperature elevation rate and the calcination temperature and time are satisfied, at the step of crystallizing the calcined molded body, such problems as surface exfoliation of the molded body, deformation of the calcined molded body and reduction of the pore volume in the calcined molded body by advance of sintering of the starting molded body can be prevented.

When a calcined molded body is prepared according to the above-mentioned procedures, even if crystallization is effected in a commercially available aqueous solution of sodium silicate No. 3 ($SiO_2$=29.3% by weight, $Na_2O$=9.36% by weight), by the action of the added seed crystal, the amount of powdery mordenite formed as a by-product is reduced to less than 1/10 of the amount of powdery mordenite formed when the seed crystal is not added, and the particle size of mordenite crystals in the synthetic mordenite molded body is small and when the molded body is formed into a catalyst, the effect of a steam treatment or the like is prominent. Furthermore, by the effect of the above-mentioned calcining method, a synthetic mordenite molded body having a uniform shape and a sufficiently large pore volume can be obtained.

However, if a commercially available aqueous solution of sodium silicate No. 3 is directly used as the crystallizing solution, the viscosity of the crystallizing solution after crystallization is drastically increased, and is further increased by cooling the reaction vessel, and this tendency is especially prominent in the vicinity of the outer surface of the synthetic mordenite molded body. Although formation of powdery mordenite is greatly decreased by the effect of the seed crystal, in the upper portion of the crystallizing packed layer, mutual adhesion of the molded body is still violent and handling is extremely difficult. For the subsequent washing step, a large quantity of warm water and a long time are necessary. More specifically, the crystallized mordenite molded body is immersed in an aqueous solution of sodium silicate having a high viscosity, and the viscosity of the aqueous solution of sodium silicate is further increased when the reaction vessel is cooled. Accordingly, in order to efficiently separate the synthetic mordenite molded body from the aqueous solution of sodium silicate, a difficult operation of withdrawing the aqueous solution of sodium silicate at a high temperature under a high pressure becomes necessary.

We carried out research with a view to eliminating this disadvantage, and found that when the $SiO_2$ concentration alone is reduced in the aqueous solution of sodium silicate used as the crystallizing solution, it is difficult to maintain the shape of the calcined molded body during crystallization, and in an extreme case, it is quite impossible to maintain the shape of the molded body. It was also found that when the $Na_2O$ concentration alone is reduced, the shape of the calcined molded body can be maintained, but crystallization is not sufficiently advanced and it is difficult to obtain a crystallized molded body having a high crystallinity, and when both of the $SiO_2$ and $Na_2O$ concentrations are reduced, also the $SiO_2/Na_2O$ molar ratio is an important factor. Namely, it was found that when a crystallizing solution having a composition described below is used, mutual adhesion of the molded body particles by powdery mordenite and highly viscous sodium silicate is not caused and handling is greatly facilitated.

More specifically, in the aqueous solution of sodium silicate used as the crystallizing solution in the present invention, the $SiO_2$ concentration is 7 to 25% by weight, preferably 7 to 12% by weight, and the $Na_2O$ concentration is 2 to 8% by weight, preferably 2 to 6% by weight. It is preferred that the $SiO_2/Na_2O$ molar ratio be from 0.9 to 4.0. The composition of the crystallizing solution is preferably within the above-mentioned range, irrespective of the composition of the starting molded body. The amount of the aqueous solution of sodium silicate used is such that the calcined molded body placed in the vessel is completely immersed therein.

In carrying out the present invention, any material or mixing method may be adopted for controlling the $SiO_2$ and $Na_2O$ concentrations and the $SiO_2/Na_2O$ molar ratio within the predetermined ranges. For example, there can be mentioned a method in which an aqueous solution of sodium silicate No. 3 is diluted with pure water. According to this method, an aqueous solution of sodium silicate having low $SiO_2$ and $Na_2O$ concentrations can be prepared relatively easily and economically advantageously without changing the $SiO_2/Na_2O$ molar ratio in the aqueous solution of sodium silicate.

Crystallization is carried out at 150° to 200° C. under an autogenous pressure, preferably for 24 to 72 hours.

During the crystallizing step, stirring may be carried out if the rotation number is such that friction among molded body particles by rotation of the stirring vane or friction between the molded body and the stirring vane does not cause wear of the molded body.

After completion of crystallization, the reaction vessel is cooled to room temperature by cooling water and the crystallized molded body is separated from the crystallizing solution, and the crystallized molded body is sufficiently washed with water or warm water and dried to obtain a sodium type synthetic mordenite molded body.

As is apparent from the foregoing description, according to the present invention, since increase of the viscosity of the aqueous solution of sodium silicate or mutual adhesion of the molded body owing to formation of powdery mordenite is not caused after termination of crystallization, handling of the crystallized molded body is very easy, and even at room temperature, the crystallized molded body can be separated from the crystallizing solution. Furthermore, when the $SiO_2$ and $Na_2O$ concentrations in the crystallizing solutions are low, formation of powdery mordenite as a by-product is not caused at all. It is considered that this is because formation of crystal nuclei of mordenite at the initial stage of crystallization is depressed because of low $SiO_2$ and $Na_2O$ concentrations in the crystallizing solution. Accordingly, mutual adhesion of the crystallized molded body owing to powdery mordenite can be completely prevented. Moreover, when a diluted aqueous solution of sodium silicate is used as the crystallizing solution, the amount of aqueous solution of sodium silicate No. 3 used can be reduced, and the process becomes economically advantageous and a large quantity of water or warm water need not be used for washing the crystallized molded body.

Furthermore, the present invention is advantageous in that crystallization of a synthetic mordenite molded body under stirred conditions becomes possible, though this is impossible in the conventional process for the preparation of a synthetic mordenite body. It is considered that this is because material transfer between the solution and the molded body is controlled. This is very important from the industrial viewpoint. When a zeolite is synthesized under stationary conditions, use of a large reaction vessel is not permissible because the temperature distribution is very large in the reaction vessel, which renders formation of a zeolite having a high degree of crystallization or a high purity difficult. As means for reducing the temperature distribution, there may be considered a method in which the heat transfer area of the reaction vessel is increased. However, if the heat transfer area of the reaction vessel is increased, the structure of the reaction vessel becomes complicated and the reaction vessel is not preferred as an industrial preparation apparatus. In the present invention, since synthesis under stirring becomes possible, no contrivance need be made on the structure of the reaction apparatus for solving the problem of the heat conduction in increasing the scale of the reaction apparatus.

The synthetic mordenite molded body prepared according to the process of the present invention can adsorb a sufficient quantity of benzene. Furthermore, even if this molded body is subjected to an ion exchange treatment, an acid treatment, a heat treatment or the like, the shape is maintained and the molded body has a mechanical strength sufficient to resist industrial applications.

Accordingly, the synthetic mordenite molded body can be used as an adsorbent as it is, and if the molded body is subjected to ion exchange with ammonium and is then calcined, a mordenite molded body of the H type can be obtained. Furthermore, an aluminum-removed H-type mordenite molded body obtained by repeating a mineral acid treatment and a heat treatment can be used as a solid acid catalyst for various reactions.

The present invention will now be described in detail with reference to the following examples.

EXAMPLES 1, 2 and 3

Compositions of Georgia kaolin, diatomaceous earth, an aqueous solution of sodium silicate (No. 3) and a seed crystal, used as the starting materials, are shown in Table 1.

TABLE 1

| | Composition (% by weight) | | | |
|---|---|---|---|---|
| | $SiO_2$ | $Al_2O_3$ | $Na_2O$ | $H_2O$ |
| Georgia kaolin | 46.26 | 38.46 | 0.22 | 13.76 |
| Diatomaceous earth | 83.70 | 3.18 | 0.22 | 10.80 |
| Aqueous solution of sodium silicate (No. 3) | 29.34 | 0.02 | 9.36 | 61.28 |
| Synthetic mordenite seed crystal | 68.65 | 11.50 | 6.81 | 11.98 |

These starting materials were mixed at ratios shown in Table 2, and the mixture was sufficiently kneaded in a vertical stirring kneader. At this step, 6 g of calcium stearate and 45 g of Avicel in Examples 1 and 3, and 135 g of Avicel (crystalline cellulose) and 90 g of carboxymethyl cellulose in Example 2, were added as the granulating assistant. The average particle size of the synthetic mordenite added as the seed crystal was 7 μm.

TABLE 2

| | Amounts (kg) added | | | | |
|---|---|---|---|---|---|
| | Georgia kaolin | Diatomaceous earth | Aqueous solution of sodium silicate | Seed crystal | Water |
| Example 1 | 1.40 | 2.64 | 4.06 | 0.26 | 0.20 |
| Example 2 | 1.22 | 3.07 | 1.84 | 0.22 | 2.30 |
| Example 3 | 1.40 | 2.64 | 4.06 | 0.26 | 0.20 |

The thus-obtained starting mixture was molded into extrudates having an outer diameter of 1.8 mm in Examples 1 and 3 or into spheres having a diameter of 2 to 4 mm in Example 2. The starting molded body was dried at 100° C. for 2 hours and charged into a calcining furnace maintained at 650° C. The temperature of the molded body was elevated from the atmospheric temperature to 650° C. for 20 minutes. The molded body was maintained at this temperature for 1 hour. Then, 1 kg of the thus-obtained calcined molded body was cooled to room temperature, and the molded body was immersed in 1.5 liters of an aqueous solution of sodium silicate having a composition shown in Table 3, heated at 180° C. for 48 hours and crystallized under an autogenous pressure.

TABLE 3

| | $SiO_2$ content (% by weight) | $Na_2O$ content (% by weight) | $SiO_2/Na_2O$ (molar ratio) |
|---|---|---|---|
| Example 1 | 8.80 | 2.81 | 3.24 |
| Example 2 | 9.30 | 4.90 | 1.94 |
| Example 3 | 17.60 | 5.62 | 3.24 |

After termination of crystallization, the reaction vessel was cooled to room temperature. After a light shock was given to the outer side of the reaction vessel by a wood hammer, the crystallized molded body in the reaction vessel could be withdrawn from the reaction vessel by a water stream. The crystallized molded body had the same shape as that of the molded body before crystallization, and the shape was not disfigured in the step of withdrawing the molded body from the reaction vessel. The amount of powdery mordenite formed as a by-product at the withdrawing step was smaller than 1 g in Examples 1 and 2, or 5 g in Example 3.

Each of the synthetic mordenite molded bodies obtained in Examples 1, 2 and 3 was pulverized and subjected to X-ray diffractometry. It was found that each product was composed of mordenite free of impurities and having a high crystallinity.

A powder X-ray diffraction diagram of the synthetic mordenite molded body obtained in Example 1 is shown in FIG. 1.

EXAMPLE 4

In the same manner as described in Example 1, 36 kg of the calcined molded body was prepared. This molded body was charged in a large-scale reaction vessel having a capacity of 100 liters, and 54 liters of an aqueous solution of sodium silicate ($SiO_2 = 8.80\%$ by weight, $Na_2O = 2.81\%$ by weight) maintained at 60° C. was poured into the reaction vessel. The temperature in the reaction vessel was elevated to 180° C. over a period of 3 hours. Crystallization was carried out at 180° C. under an autogenous pressure. Stirring the calcined molded body and crystallizing the solution in the reaction vessel were started simultaneously with the starting of the elevation of the temperature of the crystallizing solution and was stopped after the lapse of 5 hours.

After termination of crystallization, the reaction vessel was cooled to room temperature by cooling water, and the crystallizing solution was withdrawn from the lower portion of the reaction vessel. The crystallized molded body could be withdrawn from the reaction vessel only by a water stream without any shock being given to the reaction vessel. The thus-obtained crystallized molded body retained the same shape as that before the crystallization. From the results of the powder X-ray diffractometry, it was found that the crystallized molded body was composed of mordenite free of impurities and having a high crystallinity. When other physical properties were measured, it was found that, as shown in Table 4, the crystallized molded body was a synthetic mordenite molded body which could be practically used.

TABLE 4

| Chemical analysis (molar ratio) | |
|---|---|
| $SiO_2/Al_2O_3$ | 11.6 |
| $Na_2O/Al_2O_3$ | 1.02 |
| BET specific surface area | 349 m$^2$/g |

TABLE 4-continued

| | |
|---|---|
| Benzene adsorption quantity (25° C., 50 mmHg) | 7.3 wt. % |
| Pore volume | 0.23 cc/g |
| Crushing strength | 2.55 kg |

COMPARATIVE EXAMPLES 1 and 2

The calcined molded body was prepared in the same manner as described in Example 1, and 1 kg of the calcined molded body was immersed in 1.5 liters of an aqueous solution of sodium silicate and sodium hydroxide having a composition shown in Table 5. The calcined molded body was maintained at 175° C. under an autogenous pressure for 48 hours.

TABLE 5

| | $SiO_2$ content (% by weight) | $Na_2O$ content (% by weight) | $SiO_2Na_2O$ (molar ratio) |
|---|---|---|---|
| Comparative Example 1 | 29.34 | 9.36 | 3.24 |
| Comparative Example 2 | 0 | 3.80 | — |

After termination of crystallization, the reaction vessel was cooled to room temperature.

In Comparative Example 1, the crystallized molded body was obtained in the state of immersion in the aqueous solution of sodium silicate having a high viscosity, and it was impossible to withdraw the crystallized molded body from the reaction vessel in the same manner as described in Example 1. Namely, it was impossible to withdraw the crystallized molded body without deformation. The amount of powdery mordenite formed as a by-product was 26 g. From the results of the powder X-ray diffractometry of the obtained crystallized molded body, it was found that the crystallized molded body was composed of mordenite free of impurities.

In Comparative Example 2, the calcined molded body failed to retain its shape after termination of the crystallization and the crystallized product was in form of a slurry.

We claim:

1. An improvement in a process for the preparation of a synthetic mordenite molded body, which comprises molding a starting mixture consisting essentially of as the main components a silica source, an alumina source, an alkali source and water to obtain a starting molded body, calcining the molded body to obtain a calcined molded body and crystallizing the calcined molded body in an aqueous solution of sodium silicate, wherein the improvement comprises (a) making a mordenite seed crystal powder present in the starting mixture, in an amount of 0.1 to 10% by weight based on the starting mixture on a dry basis; (b) when the starting molded body is calcined, elevating the temperature by heating to a calcination temperature not lower the 400° C. at an average elevation rate of at least 10° C./min and carrying out the calcination at said calcination temperature within 2 hours; and (c) when the calcined molded body is crystallized, using an aqueous solution of sodium silicate having an $SiO_2$ concentration of 7 to 25% by weight, an $Na_2O$ concentration of 2 to 8% by weight and an $SiO_2/Na_2O$ molar ratio of from 0.9 to 4.0 as the aqueous solution of sodium silicate.

2. The process according to claim 1, wherein the starting mixture has an $SiO_2/Al_2O_3$ molar ratio of 9 to 30 and an $Na_2O/Al_2O_3$ molar ratio of 0.5 to 7.5.

3. The process according to claim 1, wherein the starting mixture has an $SiO_2/Al_2O_3$ molar ratio of 10 to 20 and an $Na_2O/Al_2O_3$ molar ratio of 0.5 to 2.

4. The process according to claim 1, wherein the alumina source is selected from the group consisting of aluminum hydroxide, aluminum oxide, sodium aluminate, aluminum sulfate, aluminum nitrate, kaolinite and montmorillonite.

5. The process according to claim 1, wherein the silica source is selected from the group consisting of amorphous silica, silica sol, silica gel, sodium silicate, and silicate minerals.

6. The process according to claim 1, wherein the alkali source is selected from the group consisting of sodium hydroxide, sodium silicate and sodium aluminate.

7. The process according to claim 1, wherein the amount of the mordenite seed crystal powder is 0.5 to 5% by weight based on the starting mixture on the dry basis.

8. The process according to claim 1, wherein the mordenite seed crystal powder has a particle diameter of about 1 $\mu$m to about 5 $\mu$m.

9. The process according to claim 1, wherein the amount of water in the starting mixture is from 40 to 120% by weight based on the starting mixture on the dry basis.

10. The process according to claim 1, wherein the calcination temperature is from 500° C. to 800° C.

11. The process according to claim 1, wherein the aqueous solution of sodium silicate has an $SiO_2$ concentration of 7 to 12% by weight and an $Na_2O$ concentration of 2 to 6% by weight.

12. The process according to claim 1, wherein the crystllization is effected at a temperature of 150° to 200° C. under an autogenous pressure.

* * * * *